(12) United States Patent
Someya et al.

(10) Patent No.: US 7,212,686 B2
(45) Date of Patent: May 1, 2007

(54) IMAGE PROCESSING APPARATUS

(75) Inventors: Ikuo Someya, Tokyo (JP); Masahiro Komoda, Kanagawa (JP); Aya Takechi, Tokyo (JP)

(73) Assignee: Sony Corporation, Tokyo (JP)

( * ) Notice: Subject to any disclaimer, the term of this patent is extended or adjusted under 35 U.S.C. 154(b) by 846 days.

(21) Appl. No.: 10/384,289

(22) Filed: Mar. 7, 2003

(65) Prior Publication Data

US 2003/0210829 A1    Nov. 13, 2003

(30) Foreign Application Priority Data

Mar. 8, 2002  (JP)  ............................. 2002-063844

(51) Int. Cl.
 *G06K 9/40*  (2006.01)
(52) U.S. Cl. ...................... 382/263; 382/260; 382/274; 382/275; 358/3.26; 358/3.27; 358/463
(58) Field of Classification Search ................ 382/260, 382/263, 264, 274, 275, 265; 358/3.26, 3.27, 358/463
See application file for complete search history.

(56) References Cited

U.S. PATENT DOCUMENTS

| | | | | |
|---|---|---|---|---|
| 4,602,285 A * | 7/1986 | Beaulier et al. | ............ | 348/580 |
| 4,987,496 A * | 1/1991 | Greivenkamp, Jr. | ........ | 358/448 |
| 5,111,511 A * | 5/1992 | Ishii et al. | .................. | 382/107 |
| 5,719,624 A * | 2/1998 | Sasaki et al. | ............ | 348/231.3 |
| 6,069,984 A * | 5/2000 | Sadler et al. | ............... | 382/321 |
| 6,469,290 B1 * | 10/2002 | Suzuki | .................... | 250/208.1 |
| 6,515,698 B1 * | 2/2003 | Sasaki et al. | ............ | 348/231.6 |
| 6,643,395 B1 * | 11/2003 | Okabe | ........................ | 382/149 |
| 6,873,373 B2 * | 3/2005 | Yamaki | ..................... | 348/625 |

FOREIGN PATENT DOCUMENTS

| | | |
|---|---|---|
| JP | 06-046293 | 2/1994 |
| JP | 07-184084 | 7/1995 |
| JP | 11-136541 | 5/1999 |

* cited by examiner

*Primary Examiner*—Matthew C. Bella
*Assistant Examiner*—Yosef Kassa
(74) *Attorney, Agent, or Firm*—Frommer Lawrence & Haug LLP; William S. Frommer

(57) ABSTRACT

An image processing apparatus for expanding the frequency band of enhancement to increase the effect of improvement of the image quality and realizing enhancement in two dimensions for an image signal by a simple circuit configuration, provided with a vertical high-pass filter, a vertical low-pass filter, a horizontal high-pass filter, and a horizontal low-pass filter as enhancers which extract high frequency components and low frequency components in vertical and horizontal directions, respectively and switches for appropriately selecting a signal of predetermined frequency components in the vertical and horizontal directions to enhance a signal of a predetermined frequency band. Accordingly, two-dimensional filtering is able to be achieved using one-dimensional filters in the vertical and horizontal directions and the enhancement effect can be improved by appropriately selecting the enhancement mode in accordance with the characteristic of the image signal.

16 Claims, 15 Drawing Sheets

FIG. 4

| TAP | T1 | T2 | T3 | T4 | T5 | T6 | T7 | T8 | T9 | T10 | T11 |
|---|---|---|---|---|---|---|---|---|---|---|---|
| COEFFICIENT | -1/64 | -2/64 | -5/64 | -8/64 | -10/64 | 52/64 | -10/64 | -8/64 | -5/64 | -2/64 | -1/64 |

C: VERTICAL HIGH - HORIZONTAL HIGH RANGE
B: VERTICAL HIGH - HORIZONTAL LOW RANGE
A: VERTICAL LOW - HORIZONTAL HIGH RANGE

K REGIONS

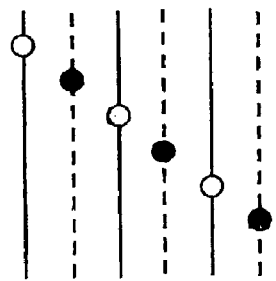
FIG.11A INTERLACED SCAN
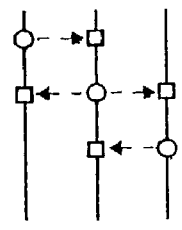
FIG.11B IN VERTICAL DIRECTION
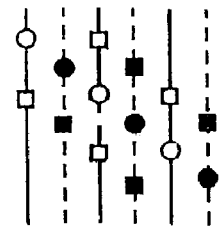
(THE SECOND FIELD)
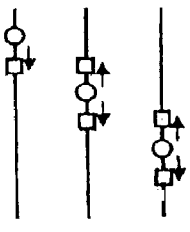
FIG.11C IN HORIZONTAL DIRECTION
(THE FIRST FIELD)
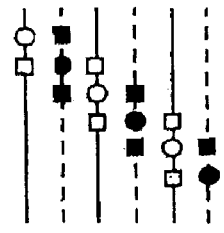
(THE FIRST / THE SECOND FIELD)

PROGRESSIVE SCAN

IN VERTICAL DIRECTION

IN HORIZONTAL DIRECTION

| TAP | T1 | T2 | T3 |
|---|---|---|---|
| COEFFICIENT | −1/4 | 2/4 | −1/4 |

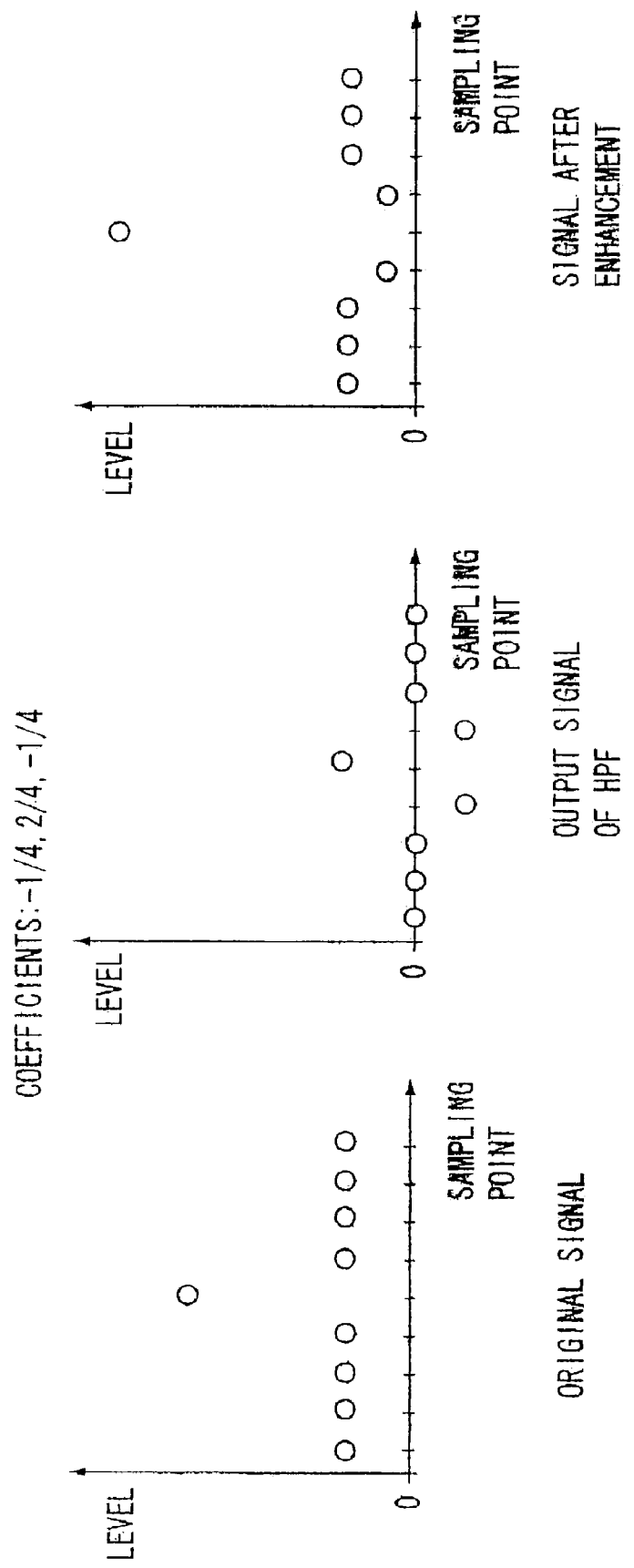

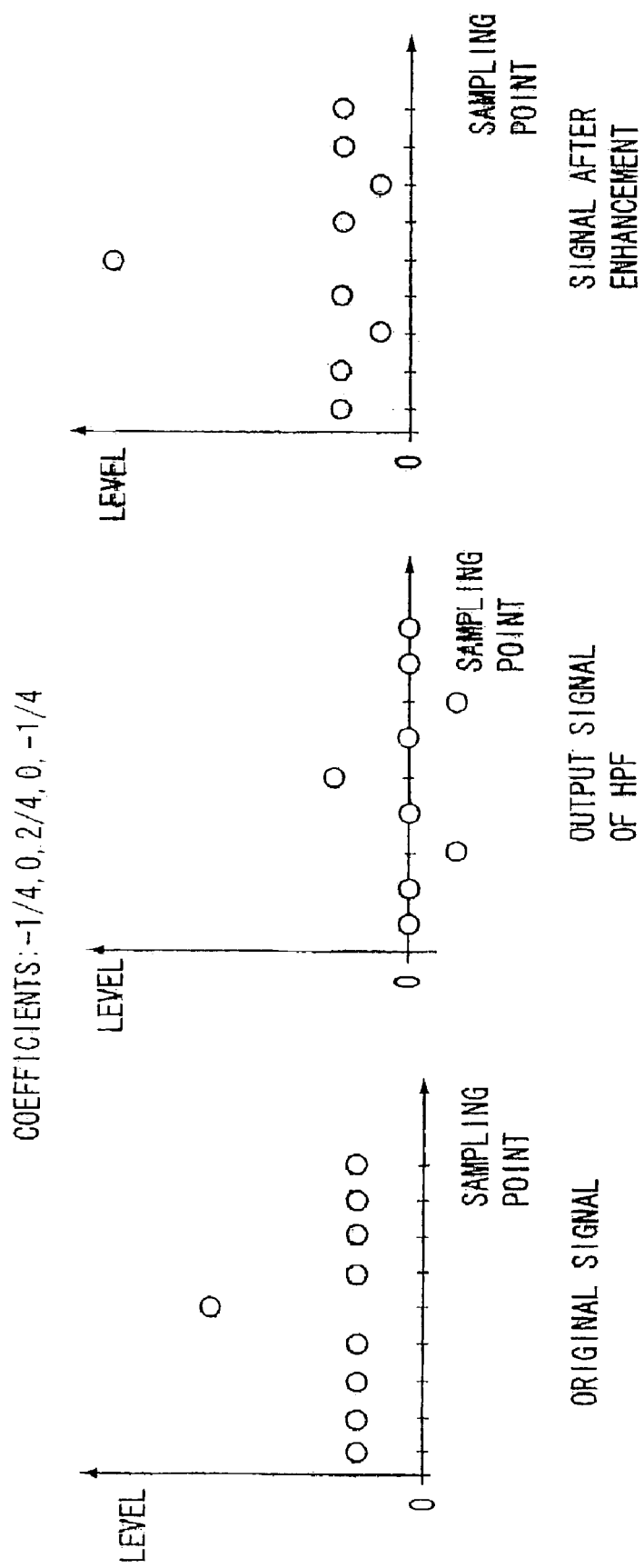

IMAGE PROCESSING APPARATUS

BACKGROUND OF THE INVENTION

1. Field of the Invention

The present invention relates to an image processing apparatus using an enhancer for enhancing predetermined frequency components of an image signal, particularly high frequency components, to improve the quality of the image.

2. Description of the Related Art

In a display for displaying an image in accordance with an input image signal, so-called "enhancement" for enhancing the high frequency components of the image signal (hereinafter referred to as the "high band components") is effective for improving the sharpness of the image. A circuit that enhances the high band components of a signal in this way is generally referred to as an "enhancer". In a display or another image display device, enhancement of the image signal before display improves the sharpness of the image and enables realization of a crisp image quality.

Ordinarily an enhancer is realized by a high-pass filter. By extracting high band components of the image signal with a high-pass filter and by adding the extracted high band components to the original image signal, an image signal enhanced in high band components is obtained.

FIG. 13 shows an example of the configuration of a generally used enhancer. As illustrated, the enhancer is constituted by a high-pass filter 10, a nonlinear processing circuit 20, an adder circuit 30, and a limiter 40. The high-pass filter 10 is constituted by delay circuits 11 and 12 and an adder circuit 13.

In the high-pass filter 10, the delay circuits 11 and 12 delay the input signal $S_{in}$ by one or two sampling periods ($T_s$ or $2T_s$) and output the delayed signals. The adder circuit 13, which has three input terminals (taps) T1, T2, and T3, adds the input signals from the taps weighted by predetermined coefficients. By controlling the coefficients of the adder circuit 13, it is possible to control the type and characteristic of the filter.

Here, if the input signal $S_{in}$ is expressed as a function of time s(t), the input signals of the taps T1, T2, and T3 can be expressed as s(t), s(t−ΔT), and s(t−2ΔT), respectively. Note that here, $\Delta T = T_s$ or $\Delta T = 2T_s$. If the coefficients of the adder circuit 13 are $w_1$, $w_2$, and $w_3$, the output signal $s_o(t)$ of the adder circuit 13 will be given as follows:

$$s_o(t) = w_1 s(t) + w_2 s(t-\Delta T) + w_3 s(t-2\Delta T) \quad (1)$$

The nonlinear processing circuit 20 performs nonlinear processing on the output signal $s_o(t)$ of the adder circuit 13, then outputs the result of processing to the adder circuit 30.

The adder circuit 30 adds the output signal $S_2$ of the delay circuit 11 and the output signal of the nonlinear processing circuit 20, then output the result of addition to the limiter 40.

The limiter 40 limits the amplitude level of the input signal to below a predetermined threshold value.

By appropriately setting the coefficients $w_1$, $w_2$, and $w_3$ of the adder circuit 13, high-pass filtering of the input signal s(t) can be achieved. Therefore, the circuit shown in FIG. 13 operates as an enhancer.

An example of the coefficients for realizing the characteristic of the high-pass filter is, for example, −¼, ½, −¼. That is, in the adder circuit 13, the coefficients provided to the taps are as shown in FIG. 14. The characteristic of the high-pass filter obtained by these coefficients is shown in FIG. 15.

Further, when the delay time of the delay circuits 11 and 12 is $2T_s$, the coefficients in the case of one sampling correspond to −¼, 0, ½, 0, −¼. The characteristic of the high-pass filter obtained by these coefficients is shown in FIG. 16.

Note that in FIGS. 15 and 16, the abscissa represents the frequency, while the ordinate represents the gain of the filter. On the abscissa, the frequency is plotted in units of the sampling frequency $f_s$. As illustrated, the maximum frequency is 0.5 $f_s$, that is, the maximum frequency determined by the sampling theorem.

By using a high-pass filter having the frequency characteristic shown in FIGS. 15 and 16, an enhancer that enhances the high band components of the input signal $S_{in}$ can be realized.

However, in the enhancers of the above related art, the frequency band being enhanced is only part of the effective frequency band of the input signal.

FIG. 17 is a graph showing the frequency components of for example a high definition signal HD having a high resolution. Since the sampling frequency $f_s$ of the HD signal is 74.25 MHz, as shown in FIG. 17, frequency components ranging up to 37.125 MHz are able to be plotted. However, the HD signal itself has almost no frequency components higher than 30 MHz, so the enhancement effect of the enhancer using the filter coefficients −¼, ½, −¼ is limited.

On the other hand, when using the filter coefficients −¼, 0, ½, 0, −¼, the frequency components in the intermediate frequency band are enhanced, while the enhancement effect for the high band components, for example, the frequency components close to 30 MHz, is poor. Furthermore, when using the coefficients described above, there is a drawback that ringing at the edge occurs in the signal passed through the high-pass filter.

FIGS. 18 and 19 show sampling values of the input signal, the filter coefficients, and the output signal of the enhancer. FIG. 18 shows a case of using −¼, ½, −¼ as the filter coefficients, while FIG. 19 shows a case of using −¼, 0, ½, 0, −¼ as the filter coefficients.

As illustrated, ringing occurs in the output signal in the case of using −¼, 0, ½, 0, −¼ as the filter coefficients.

SUMMARY OF THE INVENTION

An object of the present invention is to provide an image processing apparatus for expanding the frequency band of enhancement to improve the effect of improvement of the image quality and achieving two-dimensional enhancement for an image signal by a simple circuit configuration.

To obtain the above object, according to a first aspect of the present invention, there is provided an image processing apparatus comprising a vertical filter for extracting predetermined frequency components from an image signal in a vertical direction, a first horizontal filter for extracting first frequency components from the output signal of the vertical filter in a horizontal direction of the image signal, a second horizontal filter for extracting second frequency components from the output signal of the vertical filter in the horizontal direction of the image signal, selecting means for selectively outputting the output signal of the first horizontal filter, and adding means for adding the output signal of the selecting means and the output signal of the second horizontal filter.

According to a second aspect of the present invention, there is provided an image processing apparatus comprising a first vertical filter for extracting high frequency components from an image signal in a vertical direction, a second vertical filter for extracting low frequency components from the image signal in the vertical direction, a first horizontal filter for extracting high frequency components from the output signal of the first vertical filter in a horizontal direction of the image signal, a second horizontal filter for extracting low frequency components form the output signal of the first vertical filter in the horizontal direction of the image signal, a third horizontal filter for extracting high frequency components from the output signal of the second vertical filter in the horizontal direction of the image signal, first selecting means for selectively outputting the output signal of the first horizontal filter, first adding means for adding the output signal of the second horizontal filter and the output signal of the first selecting means, second selecting means for selectively outputting the output signal of the first horizontal filter, second adding means for adding the output signal of the second selecting means to the output signal of the third horizontal filter, a delay circuit for delaying the image signal by exactly a predetermined delay time, and third adding means for adding the output signals of the first and the second adding means to the output signal of the delay circuit.

BRIEF DESCRIPTION OF THE DRAWINGS

The above and other objects and features of the present invention will become more apparent from the following explanation of the preferred embodiments given with reference to the accompanying drawings, in which:

FIG. 4 is a view of an example of the coefficients of the horizontal high-pass filter;

FIGS. 11A to 11C are views of the enhancement in an interlaced scan;

FIG. 18 is a view of an example of sampling values of the input signal, filter coefficients, and output signal of the enhancer; and FIG. 19 is a view of another example of sampling values of the input signal, filter coefficients, and output signal of the enhancer.

DESCRIPTION OF THE PREFERRED EMBODIMENTS

Preferred embodiments of the present invention will be described in detail below while referring to the attached figures.

Figure 1:
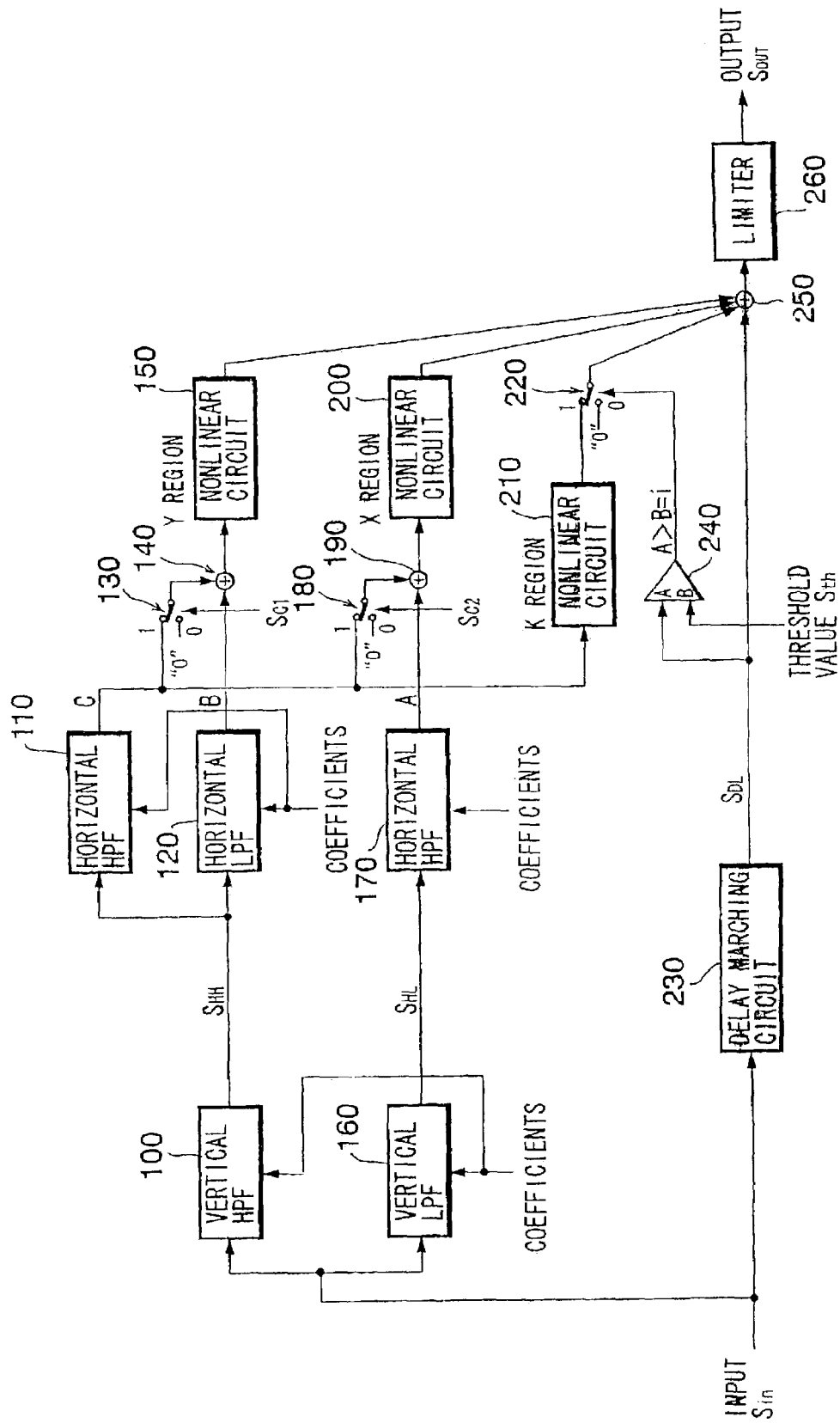
FIG. 1 is a circuit diagram of an image processing apparatus of a first embodiment according to the present invention.

FIG. 1 is a circuit diagram of an image processing apparatus using an enhancer according to a first embodiment of the present invention. As illustrated, the image processing apparatus of the present embodiment is constituted by a vertical high-pass filter 100, a horizontal high-pass filter 110, a horizontal low-pass filter 120, a switch 130, an adder circuit 140, a nonlinear circuit 150, a vertical low-pass filter 160, a horizontal high-pass filter 170, a switch 180, an adder circuit 190, a nonlinear circuits 200, 210, a switch 220, a delay matching circuit 230, a comparator 240, an adder circuit 250, and a limiter 260.

Next, the components of the image processing apparatus of the present embodiment will be explained. The vertical high-pass filter 100 and the vertical low-pass filter 160 output high frequency components(vertical high band) $S_{HH}$ and low frequency components (vertical low band) $S_{HL}$ in the vertical direction with respect to the input image signal $S_{in}$.

Note that if the image signal $S_{in}$ is input a line at a time as sampling data in the horizontal direction, the following conversion circuit for converting horizontal direction sampling data to vertical direction sampling data will be necessary for vertical filtering.

Figure 2:
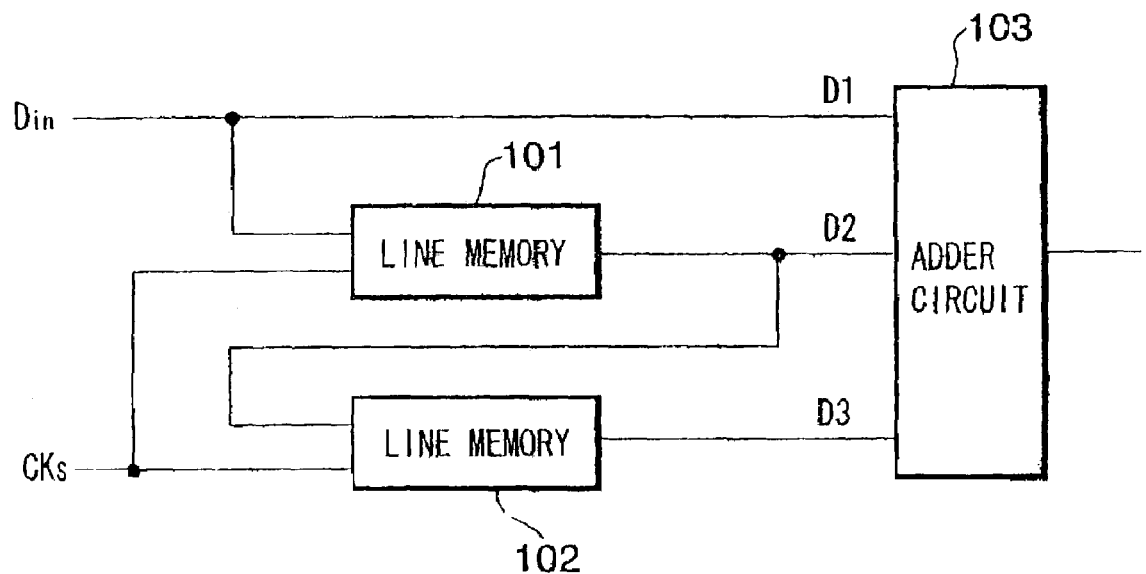
FIG. 2 is a circuit diagram of an example of the configuration of a vertical high-pass filter with a line memory.

FIG. 2 shows an example of a vertical filter containing a horizontal-vertical conversion circuit which outputs vertical direction sampling data from input horizontal direction sampling data.

As illustrated, the vertical filter is comprised by a horizontal-vertical conversion circuit and an adder circuit. The horizontal-vertical conversion circuit is comprised by line memories 101 and 102. The line memories 101 and 102 are, for example, comprised by shift registers, first-in-first-out (FIFO) circuits, and so on and have data storage capacities for storing one line of the image signal worth of data. In addition, the line memories 101 and 102 shift the input data to the output side at each period of a sampling clock $CK_s$ corresponding to the sampling clock $CK_s$ supplied from the outside.

As illustrated in FIG. 2, if the input data is D1, the output data of the line memory 101 is D2, and the output data of the line memory 102 is D3, D1, D2, and D3 are output as three sampling data adjacent in the vertical direction.

As illustrated, the sampling data D1, D2, and D3 are supplied to an adder circuit 103. The adder circuit 103 has three input taps T1, T2, and T3. The sampled data D1, D2, and D3 are input to the taps, respectively. The adder circuit 103 performs filtering by adding the three input data weighted with predetermined coefficients. By appropriately setting the coefficients, a filter having different band pass characteristics such as one of a high-pass filter or low-pass filter can be realized.

Figures 14, 15:
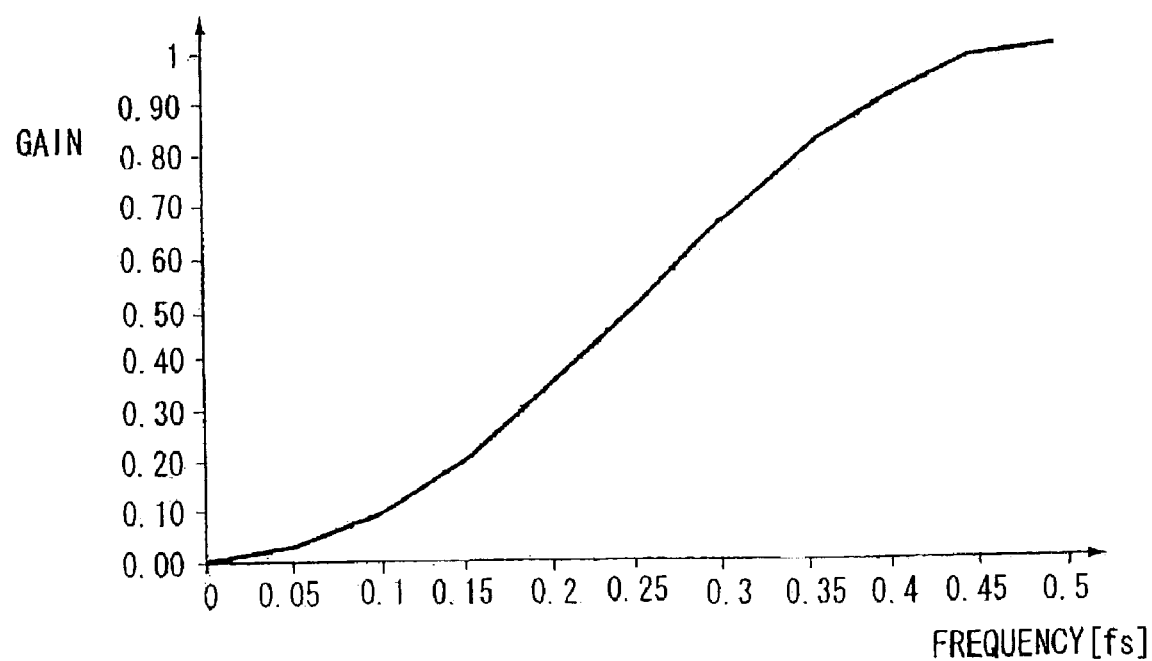
FIG. 14 is view of an example of the coefficients of a high-pass filter forming the enhancer.
FIG. 15 is a view of an example of the frequency characteristic of a high-pass filter of the related art.
Figure 16:
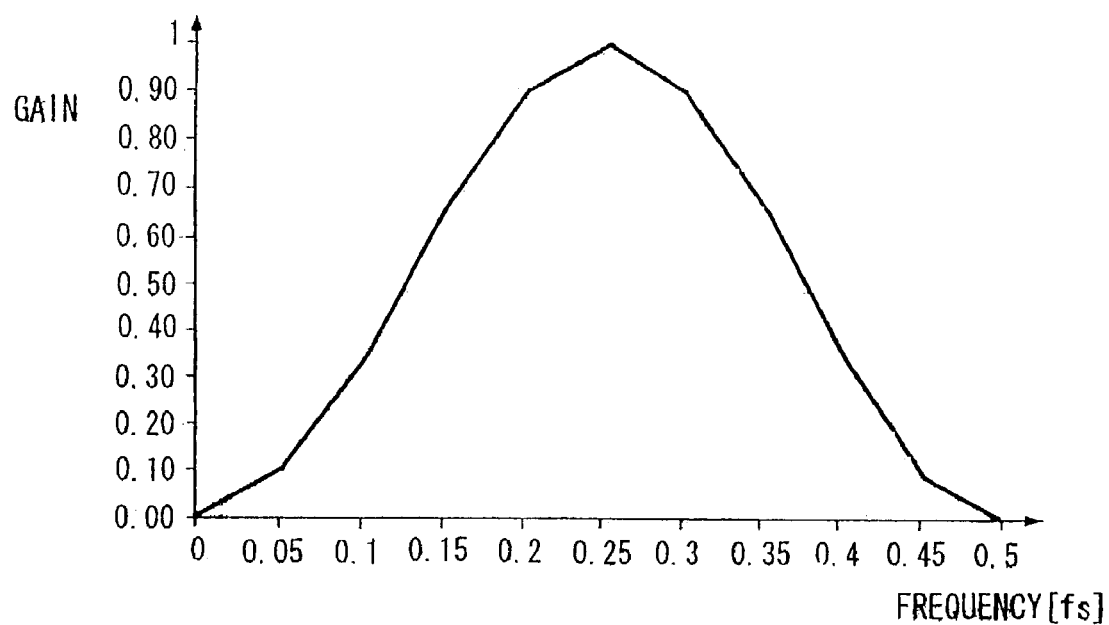
FIG. 16 is a view of another example of the frequency characteristic of a high-pass filter of the related art.

Here, as an example, the adder circuit 103 is assumed to perform high-pass filtering in the vertical direction using the coefficients shown in FIG. 14. In this case, the frequency character of the filter becomes that shown in FIG. 15. As illustrated, the cut-off frequency $f_c$ of the high-pass filter is about $f_s/4$.

By changing the coefficients of the adder circuit 103, the frequency characteristic of the vertical filter changes and therefore a vertical high-pass filter and vertical low-pass filter can be realized.

Note that the vertical filter described above is achieved by the two line memories and the adder circuit having three taps. In the image processing apparatus of the present invention, the configuration of the vertical filter is not limited by this. For example, by performing weighted addition in an adder circuit having more taps, a vertical high-pass filter having lower cut-off frequency $f_c$ can be achieved. In this case, however, because of the necessary for the increase of the number of the line memories, the scale of the circuit becomes larger. Accordingly, in the image processing apparatus of the present invention, the number of the taps in the adder circuit of the vertical filter is set smaller than that in the adder circuit of the horizontal filter.

Next, the horizontal filters of the image processing apparatus of the present invention will be explained. As illustrated in FIG. 1, the horizontal filters include the horizontal high-pass filter 110, the horizontal low-pass filter 120, and the horizontal high-pass filter 170.

As illustrated in FIG. 1, the output signal $S_{HH}$ of the vertical high-pass filter 100 is supplied to the horizontal high-pass filter 110 and the horizontal low-pass filter 120, while the output signal $S_{HL}$ of the vertical low-pass filter 160 is supplied to the horizontal high-pass filter 170.

The horizontal high-pass filters 110 and 170 extract the high band components of the input signal $S_{in}$, while the horizontal low-pass filter 120 extracts the low band components of the input signal $S_{in}$.

Below, an example of the configuration of the horizontal high-pass filter will be explained while referring to FIG. 3.

Figure 3:
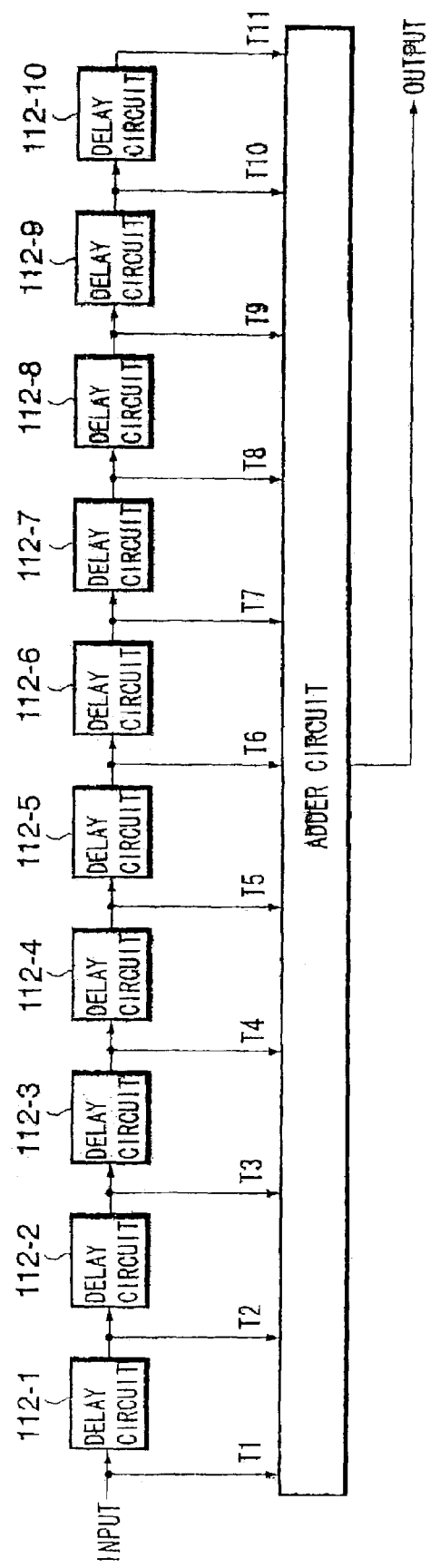
FIG. 3 is a circuit diagram of an example of the configuration of a horizontal high-pass filter.

As illustrated in FIG. 3, the horizontal high-pass filter is comprised of a cascade-connected plurality of delay circuits 112-1, 112-2, ..., 112-10 and adder circuit 113. Each delay circuit delays the input signal by one sampling period and outputs a delayed signal. As illustrated, the adder circuit 113 has, for example, 11 input taps T1, T2, ..., T11 and adds the input data from the input taps weighted by predetermined coefficients. By appropriately setting the coefficients, a filter having the desired band pass characteristic can be realized.

FIG. 4 shows an example of the coefficients. The high-pass characteristic shown in FIG. 5 can be achieved by using these coefficients.

Figure 5:
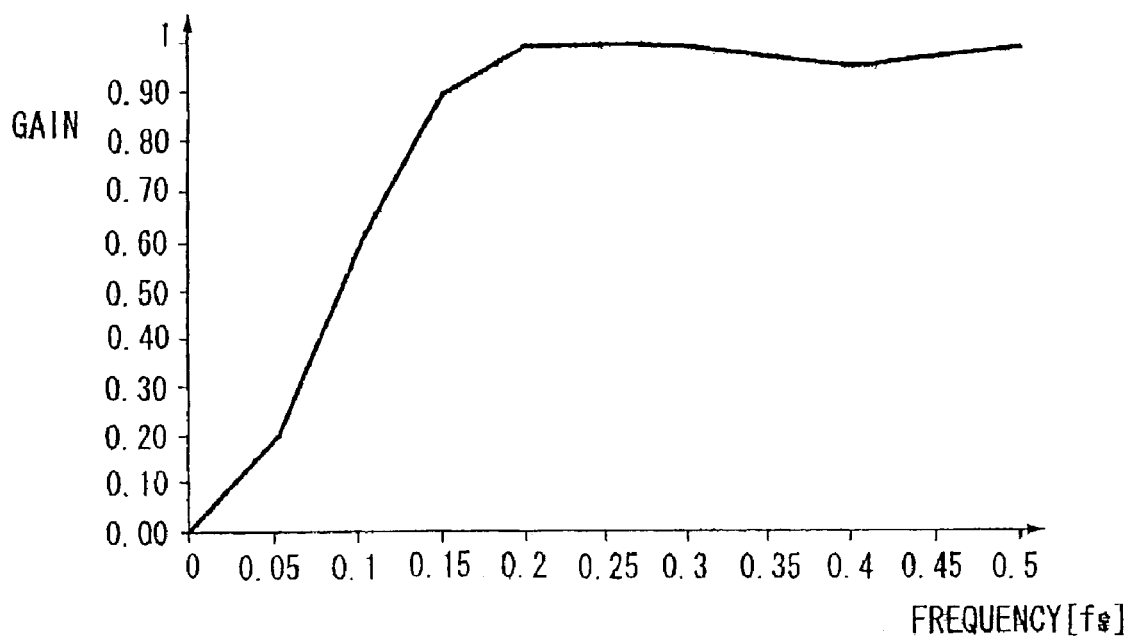
FIG. 5 is a view of an example of the frequency characteristic of the horizontal high-pass filter.

As illustrated in FIG. 5, the high-pass filter of the example has a low cut-off frequency $f_c$ of about $f_s/8$ and thus has a wide pass band.

In this way, in the image processing apparatus of the present embodiment, since the cut-off frequency $f_c$ of the horizontal high-pass filter is set lower, the enhanced band, that is, the band wherein the gain becomes near 1.0, is expanded, the components from the high frequency to low frequency are enhanced, and the enhancement effect is improved. Further, since the signal is enhanced from the low frequency band, the effect of improvement of the contrast of the image is achieved as well.

Additionally, in the present embodiment, when designing a horizontal filter, by setting the rolloff rate larger to be close to 1.0, the coefficients of the taps besides the center tap will not become positive, thus the occurrence of ringing can be avoided. This is because when the rolloff rate is set smaller, the coefficients of the taps besides the center tap become mixed ones of positive and negative values and become larger in values, so the ringing becomes remarkable.

Further, by changing the coefficients shown in FIG. 4, a horizontal filter having different frequency characteristics can be realized.

Figure 6:
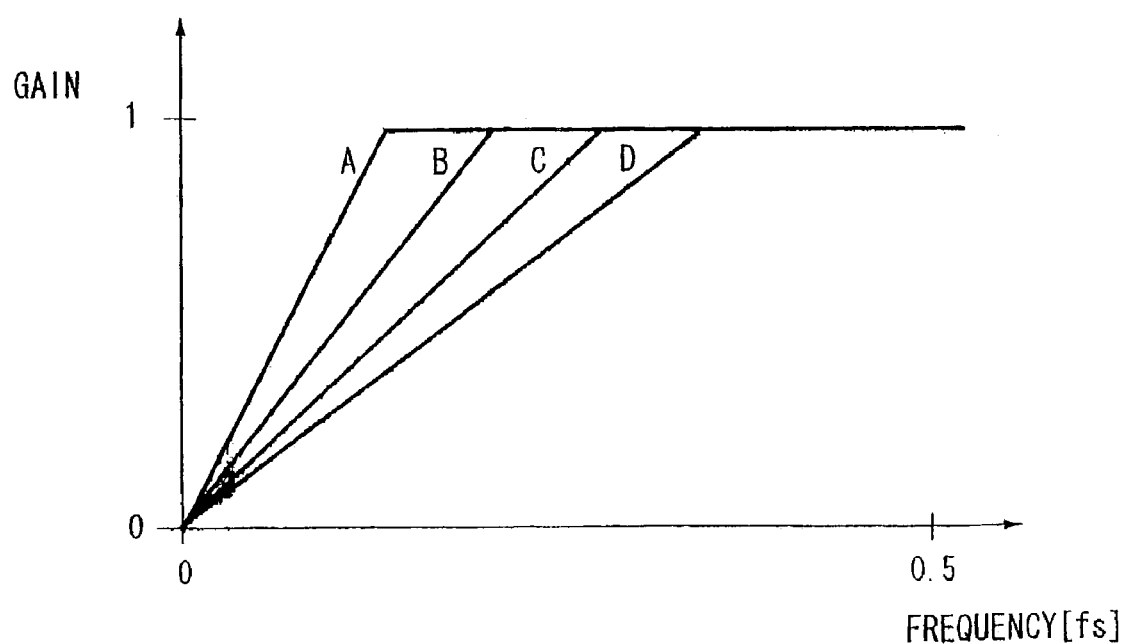
FIG. 6 is a view of the change of the filter characteristic when the coefficients thereof have been changed.

FIG. 6 shows the change of the frequency characteristic of a horizontal high-pass filter due to the change of the coefficients thereof. As illustrated, in the horizontal filter, changing the coefficients changes the gradient of the transient band from the cut-off band to the pass band in the horizontal high-pass filter, so different enhancement effects can be realized.

In the image processing apparatus of the present embodiment, for example, by preparing a plurality of coefficients in advance corresponding to characteristics of image display devices and switching the coefficients in accordance with the display device, the desired enhancement effect can be realized.

In the image processing apparatus of the present embodiment shown in FIG. 1, the horizontal high-pass filter 170, for example can have the same frequency characteristic as the above described horizontal high-pass filter 110. On the other hand, the horizontal low-pass filter 120, reverse to the horizontal high-pass filter 110, has a characteristic of passing the low frequency components and cutting off the high frequency components.

Figure 7:
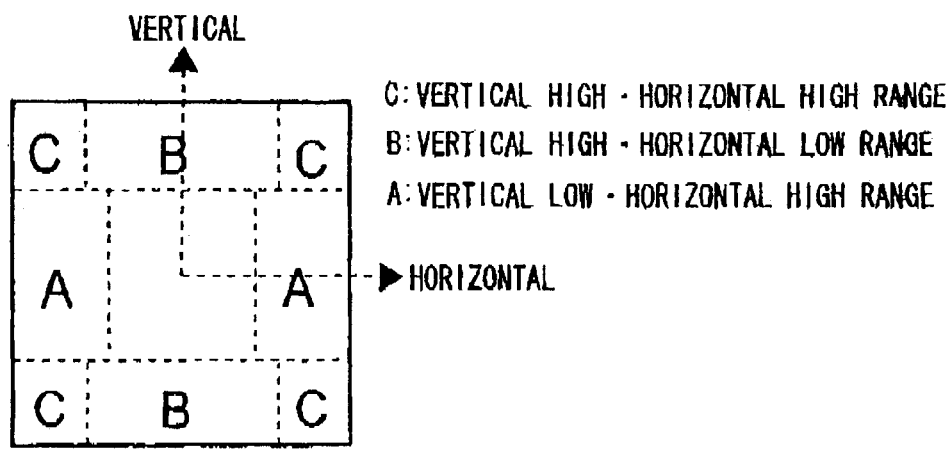
FIG. 7 is a view of the frequency components of an image signal.

FIG. 7 shows conceptually the frequency components of the output signals of the horizontal high-pass filter 110, the horizontal low-pass filter 120, and the horizontal high-pass filter 170 in the image processing apparatus of the present embodiment. In FIG. 7, the abscissa shows the horizontal direction frequency components (hereinafter referred to as the "horizontal frequency"), while the ordinate shows the vertical direction frequency components (hereinafter referred to as the "vertical frequency"). Regions A show the low band components in the vertical direction and high band components in the horizontal direction, regions B show low band components in the horizontal direction and high band components in the vertical direction, and further regions C show high band components in both the horizontal direction and vertical direction.

In the image processing apparatus of the present embodiment, as shown in FIG. 1, the output signal of the horizontal high-pass filter 110 is the output signal $S_{HH}$ of the vertical high-pass filter 100 processed by a high-pass filter in the horizontal direction, that is, a signal having frequency components of regions C shown in FIG. 7. The output signal of the horizontal low-pass filter 120 is the output signal $S_{HH}$ of the vertical high-pass filter 100 processed by a low-pass filter in horizontal direction, that is, a signal having frequency components of regions B shown in FIG. 7. On the other hand, the output signal of the horizontal high-pass filter 170 is the output signal $S_{HH}$ of the vertical low-pass filter 160 processed by a high-pass filter in the horizontal direction, that is, a signal having frequency components of regions A shown in FIG. 7.

The image processing apparatus of the present embodiment uses the vertical and horizontal filters to enhance the input signal $S_{in}$ in the horizontal direction and the vertical direction and thereby realizes two-dimensional enhancement of the image signal. Then, by selectively fetching the enhanced frequency components, only a signal of the predetermined frequency bands can be enhanced and the desired enhancement effect can be achieved.

For example, in the image processing apparatus of the present embodiment, by combining the frequency components of the three regions A, B, and C described above in predetermined modes, it is possible to realize two-dimensional filtering of an image signal by one-dimensional filters.

Below, the operation of the image processing apparatus of the present embodiment will be explained. As illustrated in FIG. 1, the image processing apparatus is provided with switches 130, 180, and 220 for selecting frequency components and adder circuits 140, 190, and 250 for adding frequency components selected by these switches.

The switch 130 selects the output signal of the horizontal high-pass filter 110 (having the frequency components of the regions C shown in FIG. 7) according to a control signal $S_{c1}$ and outputs the selected signal to the adder circuit 140. For example, when the control signal $S_{c1}$ is "1", the switch 130 outputs the output signal of the horizontal high-pass filter 110 to the adder circuit 140, while when the control signal $S_{c1}$ is "0", the switch 130 does not select the output signal of the horizontal high-pass filter 110.

Similarly the switch 180 selects the output signal of the horizontal high-pass filter 110 according to a control signal $S_{c2}$ and outputs the selected signal to the adder circuit 190. For example, when the control signal $S_{c2}$ is "1", the switch 130 outputs the output signal of the horizontal high-pass filter 110 to the adder circuit 190, while when the control signal $S_{c2}$ is "0", the switch 180 does not select the output signal of the horizontal high-pass filter 110.

The adder circuit 140 adds the output signal of the horizontal low-pass filter 120 (having the frequency components of the regions B shown in FIG. 7) and the signal selected by the switch 130 and outputs the addition result to the nonlinear circuit 150. Accordingly, when the control signal $S_{c1}$ is "1", the adder circuit 140 outputs a signal having the frequency components of the regions (B+C). Conversely, when the control signal $S_{c1}$ is "0", the adder circuit 140 outputs a signal having only the frequency components of the regions B.

Similarly, the adder circuit 190 adds the output signal of the horizontal high-pass filter 170 and the signal selected by the switch 180 and outputs the addition result to the nonlinear circuit 200. Accordingly, when the control signal $S_{c2}$ is "1", the adder circuit 190 outputs a signal having the frequency components of regions (A+C). Conversely, when the control signal $S_{c2}$ is "0", the adder circuit 190 outputs only the signal having frequency components of the regions A.

The nonlinear circuit 150 performs nonlinear processing on the output signal of the adder circuit 140 and outputs the processing result to the adder circuit 250. The nonlinear circuit 200 performs nonlinear processing on the output signal of the adder circuit 190 and outputs the processing result to the adder circuit 250. The nonlinear processings in the nonlinear circuits 150 and 200 include processing of, for example, adjusting the coring amount, clipping value, enhancing amount, limiting value, and so on of the input signal.

Further, as illustrated in FIG. 1, the output signal of the horizontal high-pass filter 110 is input to the nonlinear circuit 210. The output signal nonlinearly processed there is selected by the switch 220 and is output to the adder circuit 250.

The nonlinear circuit 210 has the same functions such as the nonlinear circuits 150 and 200. Thus, the nonlinear circuit 210 adjusts the coring amount, clipping value, enhancing amount, limiting value, and so on of the input signal.

Figure 8:
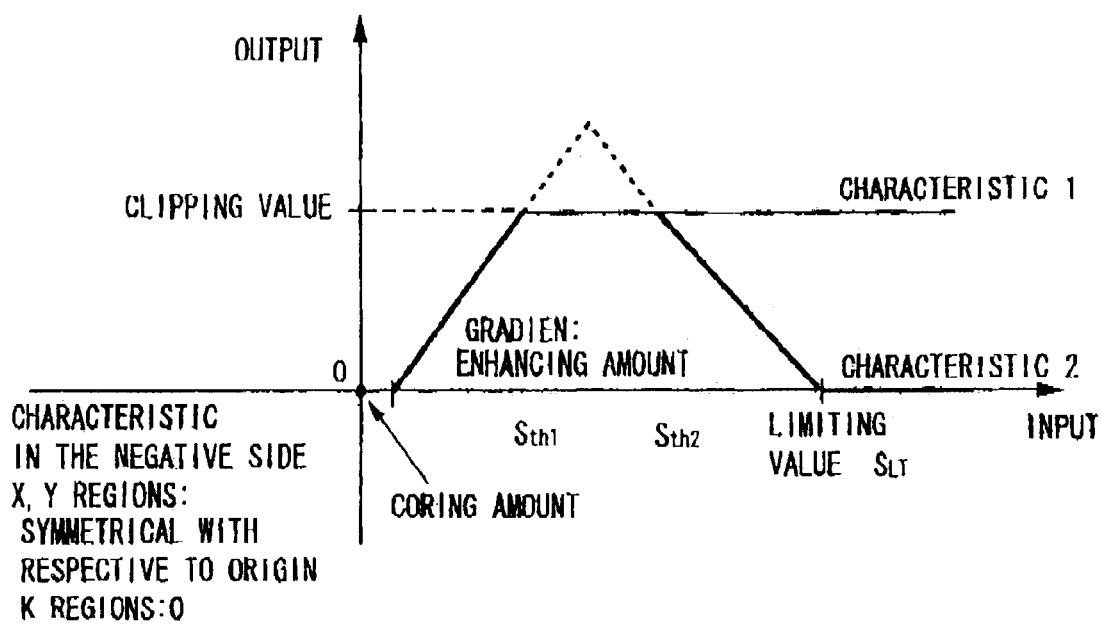
FIG. 8 is a view of the input-output characteristic of a nonlinear circuit.

FIG. 8 shows an example of the input-output characteristic of the nonlinear circuit 210. (Note that, for the nonlinear circuit 210, the input-output characteristic of the negative side is "0", The nonlinear circuits 150 and 200 have the same functions as that of the nonlinear circuit 210, but the input-output characteristics of the negative sides are symmetrical with respect to the origin O.) As illustrated, two characteristics (Characteristic 1 and Characteristic 2) are shown here. According to Characteristic 1, when the level of the input signal is lower than a predetermined threshold value $S_{th1}$, the level of the output signal is determined by a predetermined gradient according to the level of the input signal. When the level of the input signal is higher than the predetermined threshold value $S_{th1}$, the level of the output signal is clipped by a predetermined clipping value (upper limiting value).

On the other hand, according to Characteristic 2, when the level of input signal is higher than a predetermined threshold value $S_{th2}$, the level of the output level is reduced by a predetermined negative gradient, while when the level of the input signal is higher than a predetermined limit value $S_{LT}$, the level of the output signal is kept at "0".

Additionally, as illustrated in FIG. 8, in the case of either Characteristic 1 or Characteristic 2, when the level of the input signal is lower than the coring value, the output signal is kept at "0".

The switch 220 selects the output of the nonlinear circuit 210 according to the output signal of the comparator 240, then outputs the same to the adder circuit 250. For example, when the output signal of the comparator 240 is "1", the switch 220 selects the output signal of the nonlinear circuit 210 and outputs it to the adder circuit 250. However, when the output signal of the comparator 240 is "0", the switch 220 does not select the output signal of the nonlinear circuit 210.

The comparator 240 compares the output signal $S_{DL}$ of the delay matching circuit 230 with a predetermined threshold value $S_{th}$. When the output signal $S_{DL}$ is larger than the predetermined threshold value $S_{th}$, it outputs "1", while when the output signal $S_{DL}$ is smaller than the predetermined threshold value $S_{th}$, it outputs "0".

The delay matching circuit 230 outputs the delay signal $S_{DL}$ obtained by delaying the input signal $S_{in}$ by a predetermined delay time. Note that the delay time Δt of the delay matching circuit 230 is set in accordance with the processing time of the filter circuits of the vertical high-pass filter 100, the horizontal high-pass filter 110, and so on. The signal delay of the line memory is contained in the processing time of the vertical high-pass filter 100.

According to the comparator 240, the nonlinear circuit 210, and the switch 220, when the output signal $S_{DL}$ of the delay matching circuit 230 is larger than the predetermined threshold value $S_{th}$, the nonlinear processing result of the output signal of the horizontal high-pass filter 110, that is, the signal containing the frequency components of the regions C, is selected, then output to the adder circuit 250. Conversely, when the output signal $S_{DL}$ of the delay matching circuit 230 is smaller than the predetermined threshold value $S_{th}$, the output signal of the horizontal high-pass filter 110 is not selected.

Figure 9:
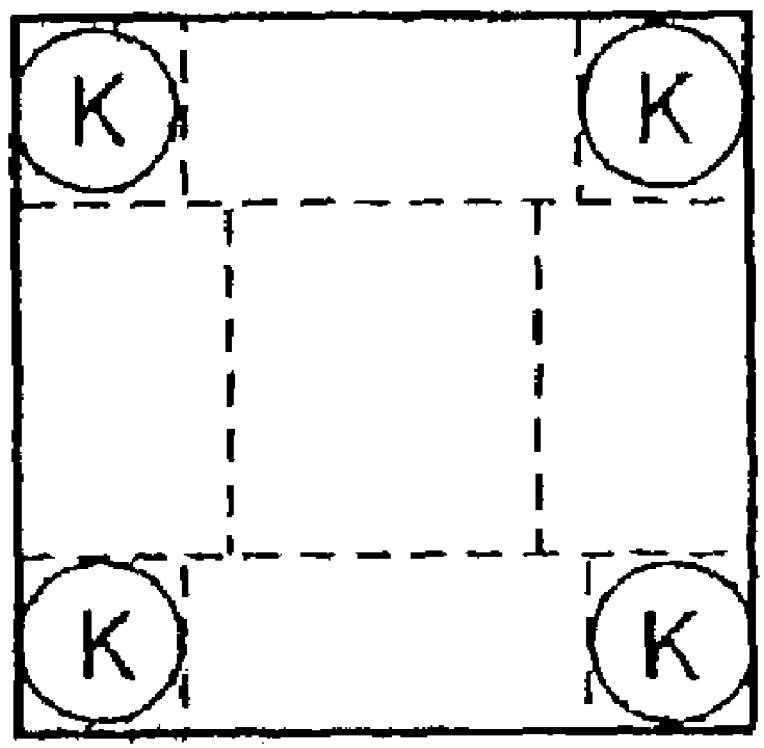
FIG. 9 is a view of the regions of vertical high band and horizontal high band signal components.

FIG. 9 shows the signal regions selected by the switch 220. In FIG. 9, the vertical high band and horizontal high band signals, that is, the frequency components of the regions C shown in FIG. 7, are contained in the regions K.

In this way, the image processing apparatus of the present embodiment performs enhancement in the slanted direction of the screen by adding the vertical high band and horizontal high band signal components, that is, the signals of the regions K shown in FIG. 9, to signals that exceed a predetermined threshold level. Accordingly, since the enhancement is performed in the slanted direction of the screen for a white signal having a high luminance level, the crispness of the displayed image can be restored.

Next, the enhancement modes able to be achieved by the selection of the switches 130 and 180 will be explained with reference to FIG. 10.

Figure 10:
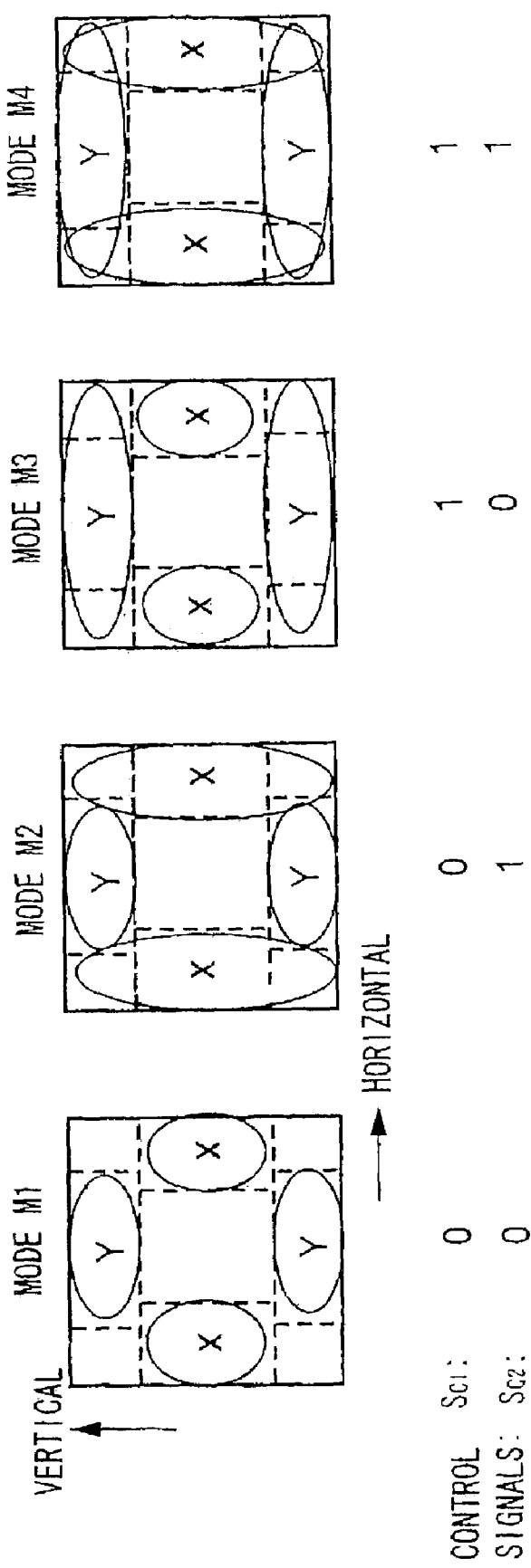
FIG. 10 is a view of enhancement modes.

In FIG. 10, four enhancement modes are illustrated. In addition, the states of the control signals $S_{c1}$ and $S_{c2}$ corresponding to each mode are illustrated.

As shown in FIG. 10, when both of the control signals $S_{c1}$ and $S_{c2}$ are "0", the enhancement of mode M1 is performed. In this state, the switches 130 and 180 do not select the output signal of the horizontal high-pass filter 110. Accordingly, the frequency components of the regions A shown in FIG. 7, that is, the vertical low band and horizontal high band signal components, are included in the X regions of the mode M1, while the frequency components of the regions B shown in FIG. 7, that is, the horizontal high band and horizontal low band signal components, are included in the Y regions.

Next, when the control signal $S_{c1}$ is "0" and the control signal $S_{c2}$ is "1", the enhancement of mode M2 is performed. In this state, the switch 130 dose not select the output signal of the horizontal high-pass filter 110, but the switch 180 does. Accordingly, the frequency components of the regions (A+C) are included in the X regions of the mode M2, and the frequency components of the regions B are included in the Y regions.

Next, when the control signal $S_{c1}$ is "1" and the control signal $S_{c2}$ is "0", the enhancement of mode M3 is performed. In this state, the switch 130 selects the output signal of the horizontal high-pass filter 110, but the switch 180 does not. Accordingly, the frequency components of the regions A are included in the X regions of the mode M3, and the frequency components of the regions (B+C) are included in the Y regions.

Finally, when both of the control signals $S_{c1}$ and $S_{c2}$ are "1", the enhancement of mode M4 is performed. In this case, both of the switches 130 and 180 select the output signal of the horizontal high-pass filter 110. Accordingly, the frequency components of the regions (A+C) are included in the X regions of the mode M4, and the frequency components of the regions (B+C) are included in the Y regions. That is, in the mode M4, portions of the X regions and the Y regions overlap, so double enhancement is performed on the frequency components.

As described above, in the mode M1, since the vertical high band and horizontal high band frequency components of the regions C are not selected, the enhancement effect in the slanted direction of the image is lower. On the other hand, in the mode M4, since the frequency components of the regions C are doubly enhanced, the balance with the other frequency components becomes poor. As a result, in the image processing apparatus of the present embodiment, by suitably selecting the mode M1, M2, and M3 and further selecting and adding the vertical high band and horizontal high band frequency components of the regions C in accordance with the input luminance level, the predetermined enhancement effect is able to be achieved.

Below, the selection of the enhancement modes in accordance with image signal will be explained.

The selection of the enhancement modes differs, for example, according to the difference of the scan lines of the image signal. When the image signal is displayed on a display device, if the signal becomes blunt in the vertical direction, the deterioration of the image quality becomes more obvious. Accordingly, if enhancing slanted direction frequency components in the vertical direction by the mode M3, the effect of improvement of the image quality appears remarkably.

FIGS. 11A to 11C and FIGS. 12A to 12C are views of the enhancement in the vertical direction and in the horizontal direction in the case of an interlaced scan and progressive scan, respectively.

Figure 17:
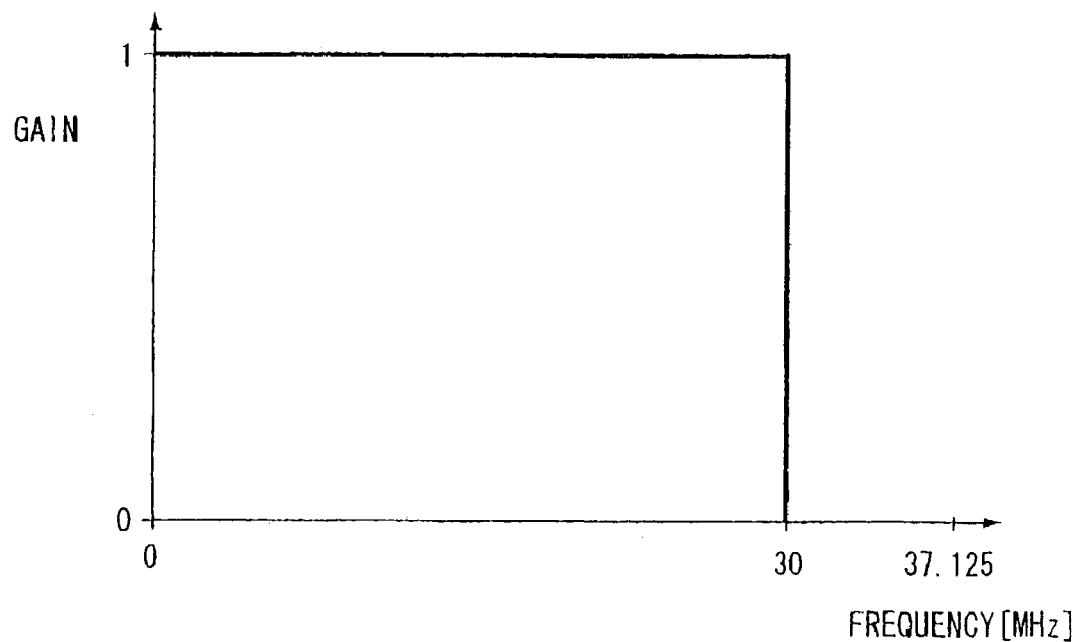
FIG. 17 is a view of an example of the frequency components of a HD image signal.

As illustrated in FIG. 11A, in the case of an interlaced scan, odd-numbered lines and even-numbered lines are scanned separately, whereby an odd-numbered field (namely, the first field shown in FIG. 17) and an even-numbered field (namely, the second field shown in FIG. 17) are displayed. Because the scan lines of the first field and the second field are offset by one line each on the screen, an image of one frame is formed by combining these fields.

Figure 12A:
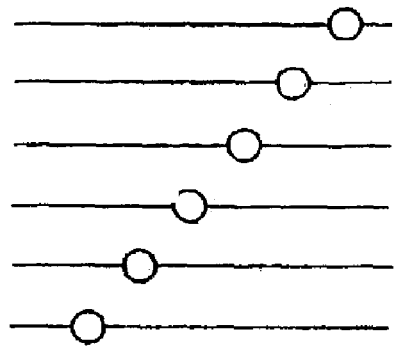
FIGS. 12A to 12C are views of the enhancement in a progressive scann.

On the other hand, as illustrated in FIG. 12A, in the case of a progressive scan, all of the lines are scanned in turn. That is, an image of one frame is formed by one scan.

In the case of an interlaced scan as shown in FIGS. 11A to 11C, if enhancing slanted direction components in the vertical direction, since the enhancement is performed separately in the odd-numbered field and the even-numbered field, a plurality of pixels sampled every other line in the vertical direction of the image is filtered. Accordingly, as illustrated in FIGS. 11B, ringing end up spreading as a result of the enhancement.

Figure 12B:
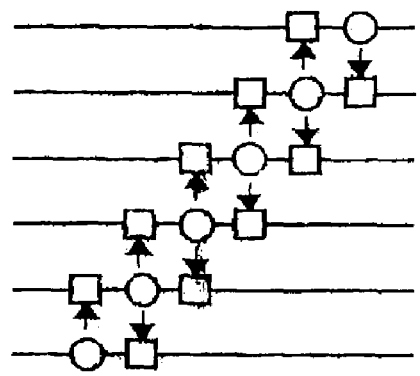
Figure 12C:
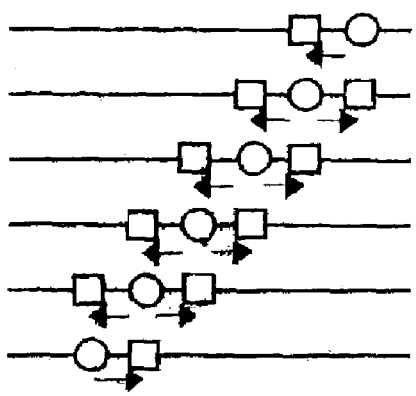
Figure 13:
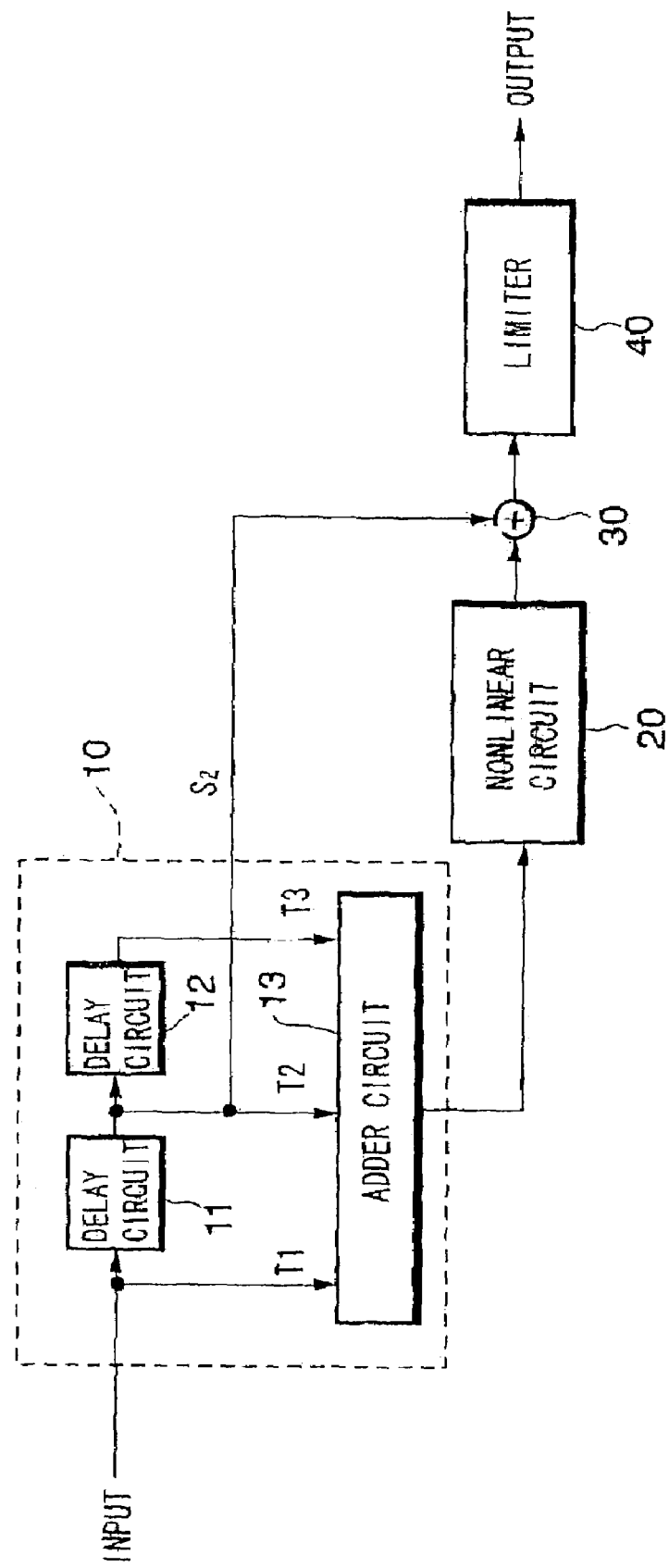
FIG. 13 is circuit diagram of an example of the configuration of an enhancer of the related art.

On the other hand, as illustrated in FIGS. 12A–12C, in the case of a progressive scan, lines of the image signal of one frame are input continuously without distinction as to the odd-numbered field and the even-numbered field. Therefore, as illustrated in FIG. 12B, in the enhancement in the vertical direction, since the filtering is performed for a plurality of pixels continuing in the vertical direction on the screen, ringing does not spread after the enhancement such as in an interlaced scan.

Note that, in the case of an interlaced scan as shown in FIG. 11C, since the image signal is input continuously in the horizontal direction without distinction to the odd-numbered field and the even-numbered field, the horizontal direction enhancement can give the same effect as the case of a progressive scan.

As described above, in comparison with the case of a progressive scan, in the case of an interlaced scan, the waveform of enhancement occurs at positions away from the pixels in question and ringing spreads. Here, in the case of an interlaced scan, the mode M2 for enhancing the slanted direction frequency components in the horizontal direction is selected, while in the case of a progressive scan, the mode M3 for enhancing the slanted direction frequency components in the vertical direction is selected. Accordingly, the enhancement can be achieved with the most suitable enhancement mode for each different scan method, and the effect of improvement of image quality can be further increased.

Further, when the signal band becomes narrower for some reason, the waveform of the image signal becomes blunt and a high luminance signal near the white peak, for example, the image of a necklace, loses its crispness. In such a case, as described above, the nonlinear circuit 210, the switch 220, and the comparator 240 enhance a signal beyond a certain threshold level to the positive side. Accordingly, since the enhanced part is limited to the white signal desired to be enhanced more in comparison with other parts and a signal of another level is not enhanced, double enhancement and over-enhancement of the frequency bands in the slanted directions can be prevented. By processing in this way, only the white signal is further enhanced the crispness of the image can be restored without a feeling of incongruity.

As explained above, according to the image processing apparatus of the present embodiment, by providing vertical high-pass filters and horizontal high-pass filters as enhancers and appropriately selecting the vertical and horizontal frequency components by switches, a signal of desired frequency bands can be enhanced. Additionally, according to the present embodiment, two-dimensional filtering can be achieved by using one-dimensional filters for the vertical and horizontal directions. Furthermore, an improved effect of enhancement can be obtained by choosing the most suitable enhancement mode in accordance with the configuration of the scan lines of the image signal.

Additionally, in the image processing apparatus of the present embodiment, by enhancing a signal exceeding a certain level in the vertical high band and the horizontal high band, the crispness of the image can be restored without a feeling of incongruity.

Summarizing the effects of the invention, as described above, according to the present invention, by setting the cut-off frequency of the horizontal high-pass filter used as an enhancer lower, it is possible to expand the pass band in the horizontal direction, improve the enhancement effect, and further improve the contrast of the image.

Additionally, according to the present invention, by combining the filtering in the vertical direction and the horizontal direction, two-dimensional filtering can be easily realized by one-dimensional filters and a better effect of enhancement can be achieved with a simple circuit configuration.

Furthermore, according to the present invention, by enhancing the high frequency components in both of the vertical and horizontal directions for a signal exceeding a predetermined level, the crispness of the image quality can be restored without a feeling of incongruity.

While the invention has been described with reference to specific embodiments chosen for purpose of illustration, it should be apparent that numerous modifications could be made thereto by those skilled in the art without departing from the basic concept and scope of the invention.

What is claimed is:

1. An image processing apparatus comprising:
   a vertical filter for extracting predetermined frequency components from an image signal in a vertical direction,
   a first horizontal filter for extracting first frequency components from the output signal of the vertical filter in a horizontal direction of the image signal,
   a second horizontal filter for extracting second frequency components from the output signal of the vertical filter in the horizontal direction of the image signal,
   selecting means for selectively outputting the output signal of the first horizontal filter, and
   adding means for adding the output signal of the selecting means and the output signal of the second horizontal filter.

2. An image processing apparatus according to claim 1, wherein the vertical filter comprises:
   a plurality of storage means for each storing one line of said image signal in the horizontal direction worth of sampling data and connected in series and
   vertical filter adding means for adding the values of the image signal of at least one line before stored in the plurality of storage means and the values of the image signal of the current line with predetermined weight coefficients.

3. An image processing apparatus according to claim 1, wherein the first and the second horizontal filters comprise horizontal filter adding means for adding a plurality of sampling data of the image signal in the horizontal direction.

4. An image processing apparatus according to claim 1, further comprising:
   a delay circuit for delaying the image signal by a predetermined delay time and
   second adding means for adding the output signal of the adding means and the output signal of the delay circuit.

5. An image processing apparatus according to claim 4, further comprising processing means for clipping the output signal of the second adding means by a predetermined upper limit value.

6. An image processing apparatus according to claim 4, further comprising:
   a comparison circuit for comparing the output signal of the delay circuit with a predetermined reference signal and
   second selecting means for selecting the output signal of the first horizontal filter in accordance with the comparison result of the comparison circuit,
   the second adding means adding the output signal of the second selecting means to the output signal of the delay circuit.

7. An image processing apparatus according to claim 6, further comprising nonlinear processing means for clipping the output signal of the comparison circuit with a predetermined upper limit value.

8. An image processing apparatus comprising:
   a first vertical filter for extracting high frequency components from an image signal in a vertical direction,
   a second vertical filter for extracting low frequency components from the image signal in the vertical direction,
   a first horizontal filter for extracting high frequency components from the output signal of the first vertical filter in a horizontal direction of the image signal,
   a second horizontal filter for extracting low frequency components form the output signal of the first vertical filter in the horizontal direction of the image signal,
   a third horizontal filter for extracting high frequency components from the output signal of the second vertical filter in the horizontal direction of the image signal,
   first selecting means for selectively outputting the output signal of the first horizontal filter,
   first adding means for adding the output signal of the second horizontal filter and the output signal of the first selecting means,
   second selecting means for selectively outputting the output signal of the first horizontal filter,
   second adding means for adding the output signal of the second selecting means to the output signal of the third horizontal filter,
   a delay circuit for delaying the image signal by exactly a predetermined delay time, and
   third adding means for adding the output signals of the first and the second adding means to the output signal of the delay circuit.

9. An image processing apparatus according to claim 8, wherein each of the first and second vertical filter comprises:
   a plurality of storage means for each storing one line of said image signal in the horizontal direction worth of sampling data and connected in series and
   vertical filter adding means for adding the values of the image signal of at least one line before stored in the plurality of storage means and the values of the image signal of the current line with predetermined weight coefficients.

10. An image processing apparatus according to claim 8, wherein the first and the second horizontal filters comprise horizontal filter adding means for adding a plurality of sampling data of the image signal in the horizontal direction.

11. An image processing apparatus according to claim 8, further comprising:

a comparison circuit for comparing the output signal of the delay circuit with a predetermined reference signal and third selecting means for selecting and outputting the output signal of the first vertical filter when the comparison result of the comparison circuit shows that the level of the output signal of the delay circuit is higher than that of the standard signal, the third adding means adding the output signal of the third selecting means.

12. An image processing apparatus according to claim 8, further comprising first and second nonlinear processing means for clipping the output signal of the first and second adding means by a predetermined upper limit value and supplying the results to the third adding means.

13. An image processing apparatus according to claim 11, further comprising third nonlinear processing means for clipping the output signal of the first horizontal filter by a predetermined upper limit value and supplying the result to the third selecting means.

14. An image processing apparatus according to claim 8, further comprising processing means for clipping the output signal of the third adding means by a predetermined upper limit value.

15. An image processing apparatus according to claim 8, wherein the coefficients of the first, second, and third horizontal filters are variable.

16. An image processing apparatus according to claim 8, wherein, when the image signal is obtained by an interlaced scan, the output signal of the first horizontal filter selected by the second selecting means is added by the second adding means to the output signal of the third horizontal filter, and when the image signal is obtained by a progressive scan, the output signal of the first horizontal filter selected by the first selecting means is added by the first adding means to the output signal of the second horizontal filter.

* * * * *